United States Patent
Cultraro

(10) Patent No.: US 7,364,023 B2
(45) Date of Patent: Apr. 29, 2008

(54) DEVICE FOR SLOWING THE MOVEMENT OF A DRAWER OR SIMILAR MOVABLE MEMBER, HAVING RELEASABLE LOCKING MEANS

(76) Inventor: Antonino Cultraro, Via Montegrappa 26, I-10098 Rivoli (Torino) (IT)

( * ) Notice: Subject to any disclaimer, the term of this patent is extended or adjusted under 35 U.S.C. 154(b) by 67 days.

(21) Appl. No.: 10/577,917

(22) PCT Filed: Oct. 29, 2003

(86) PCT No.: PCT/IT03/00666

§ 371 (c)(1), (2), (4) Date: May 1, 2006

(87) PCT Pub. No.: WO2005/040535

PCT Pub. Date: May 6, 2005

(65) Prior Publication Data

US 2007/0158152 A1    Jul. 12, 2007

(51) Int. Cl.
*E05F 3/04*  (2006.01)
(52) U.S. Cl. .......................... 188/290; 16/62
(58) Field of Classification Search ............... 188/290, 188/293, 296, 322.5; 16/62, 82; 74/574
See application file for complete search history.

(56) References Cited

U.S. PATENT DOCUMENTS

| | | | |
|---|---|---|---|
| 4,618,039 A | 10/1986 | Omata | |
| 4,694,530 A * | 9/1987 | Foggini | 16/82 |
| 4,828,344 A | 5/1989 | Omata | |
| 5,001,809 A * | 3/1991 | Kim et al. | 16/62 |
| 5,904,411 A * | 5/1999 | Hayakawa | 312/319.2 |
| 6,154,924 A * | 12/2000 | Woo | 16/62 |
| 2003/0183039 A1* | 10/2003 | Ohta et al. | 74/574 |
| 2007/0000742 A1* | 1/2007 | Cultraro | 188/290 |

FOREIGN PATENT DOCUMENTS

GB    2 062 933 A    5/1981

\* cited by examiner

*Primary Examiner*—Chris Schwartz
(74) *Attorney, Agent, or Firm*—Sughrue Mion, PLLC

(57) ABSTRACT

A device (15) for slowing the movement of a drawer (2) urged by unidirectional thrust means (4), including a casing (17) fixable to a structure (S) and defining a chamber (18) filled with a viscous fluid, and a rotor (31). The rotor (31) includes a disc portion (32) and a shaft portion (33) protruding through the lid (21) of the casing (17) in such a way as it can be associated with the door (2). The base surface (23a) of the chamber (18) has a recess (51) operable to house a pivotable arm (52). The arm (52) has a pin portion (54) protruding into the chamber (18). The lower surface (62) of the disc portion (32) of the rotor (31) has a groove (70) for engaging the pin portion (54) of the arm (52). At one end (73), the groove (70) has a cam (76) dividing it into a return path (75) and a forward path (74) for the pin portion (54) so as to define a locking position for the rotor (31) in cooperation with the thrust means (4).

6 Claims, 4 Drawing Sheets

DEVICE FOR SLOWING THE MOVEMENT OF A DRAWER OR SIMILAR MOVABLE MEMBER, HAVING RELEASABLE LOCKING MEANS

This is a National Stage entry of International Application PCT/IT2003/000666, with an international filing date of Oct. 29. 2003, which was published as WO 2005/040535 A1, and the complete disclosure of which is incorporated into this application by reference.

BACKGROUND OF THE INVENTION

The present invention relates to a device for slowing the movement of a drawer or similar member which is movable with respect to a fixed structure and urged by unidirectional thrust means.

A device of this type is known from British Patent Application GB-A 2 062 933 and is normally used to smooth the movement of a slidable drawer caused by spring means, as used in certain types of ashtray fitted in the dashboard of motor vehicles.

It is also known that such drawers often have latch closure means which are released by a light pressure on the drawer, so that pressure is used to carry out both opening and closing operations.

The document EP-A-0 199 242 describes a device in which the latch closure means include a sphere engaged in a rectilinear groove, formed in the lateral surface of the stator, and urged by a shaped groove formed in the lateral wall of the rotor and having a cam defining a forward path and a return path for the sphere.

SUMMARY OF THE INVENTION

The object of the present invention is a device for slowing the movement of a drawer of a compact type, having the characteristics defined in the Claims.

BRIEF DESCRIPTION OF THE DRAWINGS

A few preferred but non-limitative embodiments of the invention will now be described with reference to the appended drawings, in which.

DETAILED DESCRIPTION OF THE INVENTION

Figure 1:
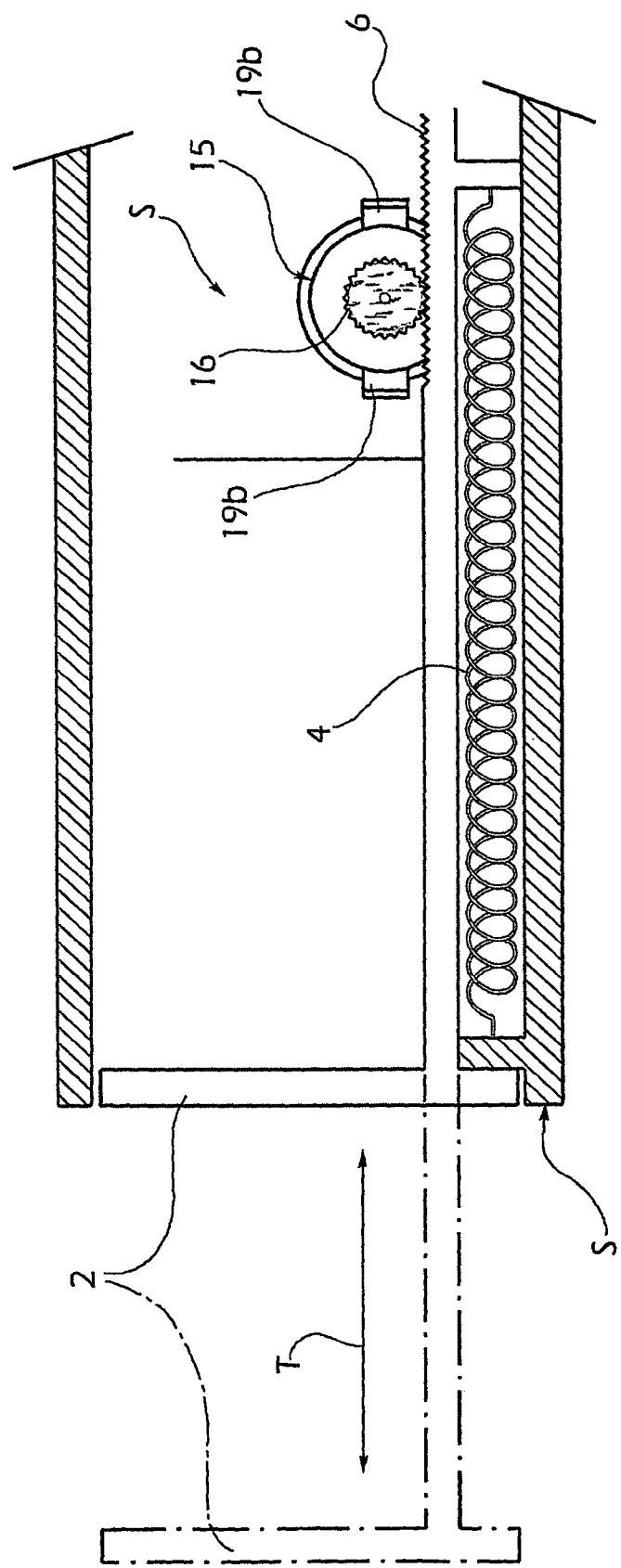
FIG. 1 is a longitudinally sectioned view of the structure of a drawer incorporating a slowing device according to the invention.

With reference to FIG. 1, numeral reference 2 designates a drawer, for example, the drawer of an ashtray fitted in the dashboard of a motor vehicle, which can translate relative to the structure S of the dashboard along a direction defined by arrows T, while 4 schematically indicates a spring which urges the drawer into its open position. A rectilinear rack 6 is secured to the drawer 2. A slowing device 15 of the invention is also secured to the structure S of the dashboard, with a rotatable pinion 16 arranged so as to engage the teeth of the rack 6.

Figure 2:
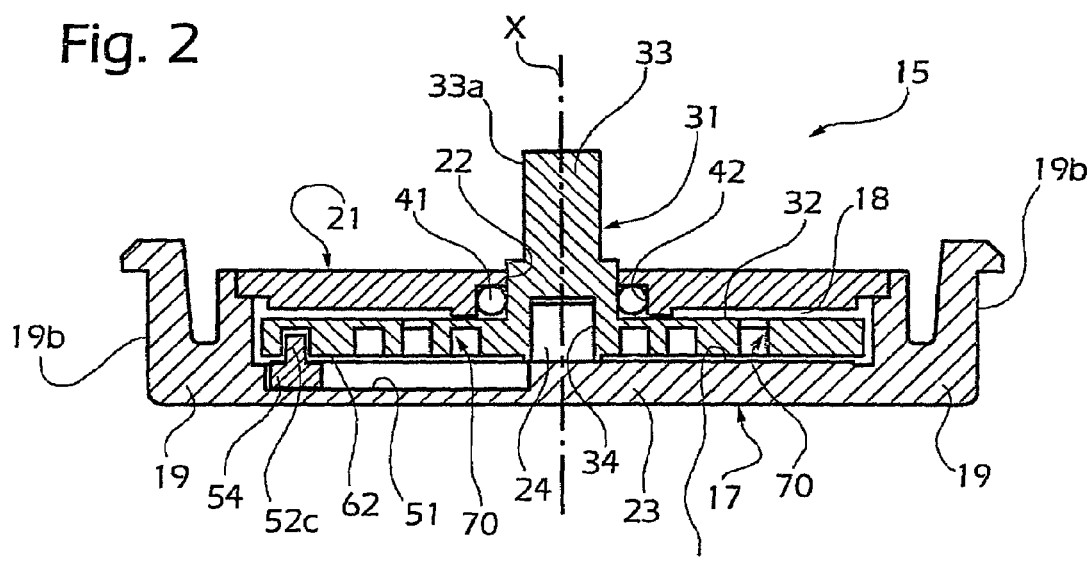
FIG. 2 is a longitudinally sectioned view of an embodiment of a slowing device according to the invention.

With reference to FIG. 2, the device 15 substantially includes a casing 17, defining internally a substantially cylindrical chamber 18 open at one end, and having a pair of lateral extensions 19 provided with fixing means 19b. In the shown embodiment, such fixing means 19b are represented by resilient flap portions extending upwardly. These portions 19b are provided for rapid engagement coupling with one of the two bodies whose relative movement needs to be slowed, for example with the structure S of the dashboard. These portions 19b could, of course, be of a different shape, being folded downwards, for example, or the lateral wings 19 could have fixing holes adapted to receive screws, rivets and the like for rigidly securing these extensions 19 to the structure S.

The open end of the cylindrical chamber 18 is adapted to be closed by a lid 21 which is fixed to the casing 17 so as to provide a fluid tight seal, for example by gluing or welding. The lid 21 has a central through-hole 22. The base 23 of the cylindrical chamber 18, corresponding to the base of the casing 17, has a pin portion 24 which projects axially from the centre of the base 23 of the chamber 18 inwardly thereof.

The device 15 also includes a rotor 31 housed in the chamber 18. The rotor 31 includes a disc portion 32, rotatable inside the casing 17, and a shaft portion 33 which extends axially from the centre of the disc portion 32 and protrudes from the lid 21 of the casing 17, passing through the central hole 22. The free end 33a of the shaft portion 33 of the rotor 31 is arranged so the pinion 16 can be mounted thereon. The rotor 31 also has a central hole 34, formed in the base of the disc portion 32 for enabling the rotor 31 to be mounted on the pin portion 24 of the casing 17 and providing thereby an axis x of rotation for the rotor.

The chamber 18 filled with a highly viscous fluid of a known type, in such a way that the rotor 31 is fully immersed. The fluid tight seal at the central hole. 22 is ensured by an O-ring 41 housed in a circular seat 42 formed around the central hole 22 through the lid 21.

Figure 3:
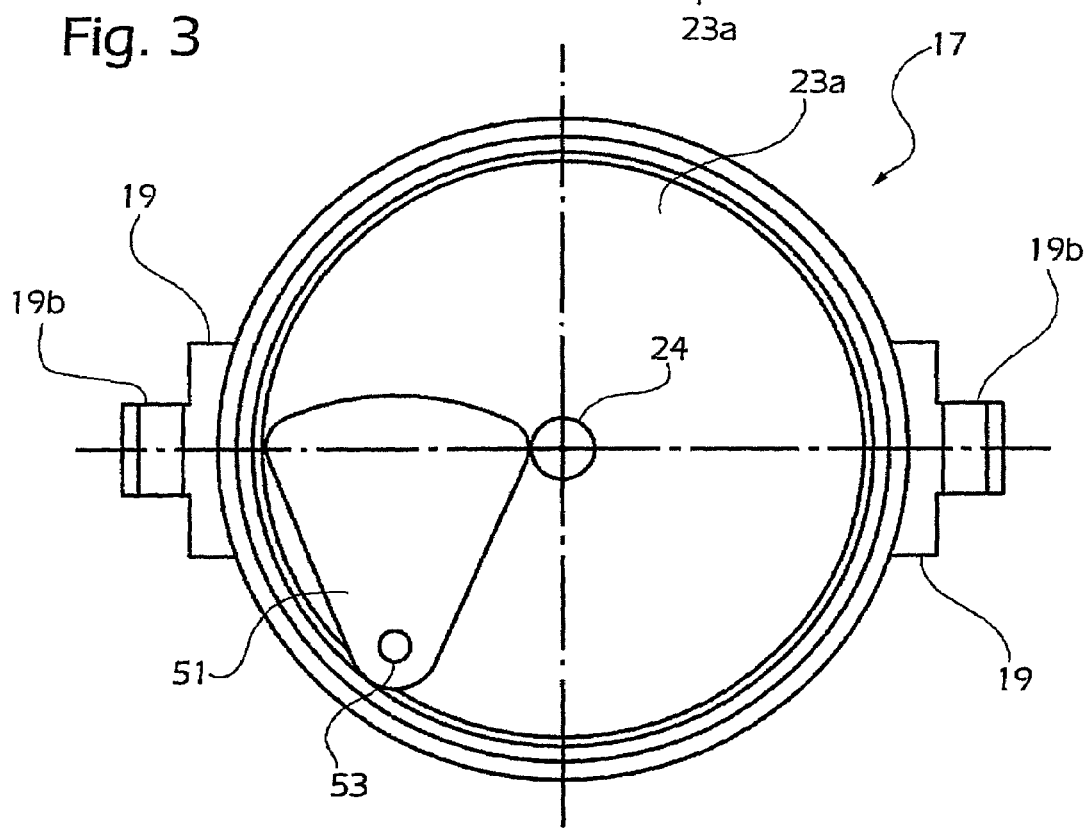
FIG. 3 is a plan view of a component of the device of FIG. 2.
Figure 7:
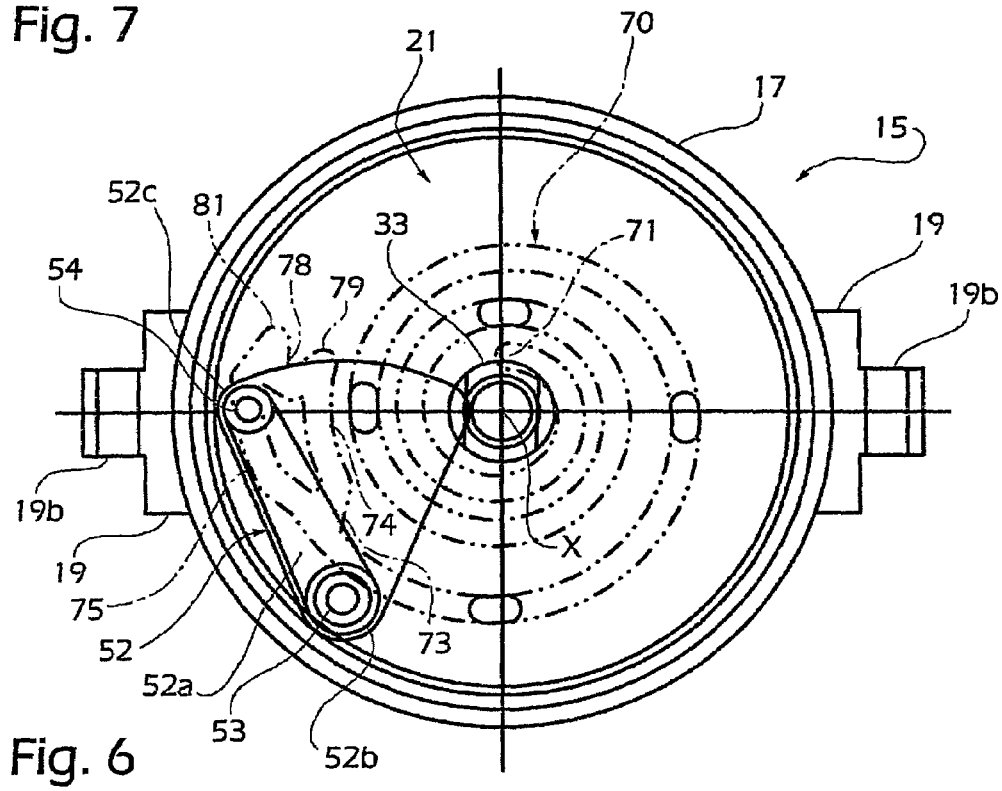
FIGS. 6 and 7 are plan views illustrating the operation of the slowing device of the invention.
Figure 6:
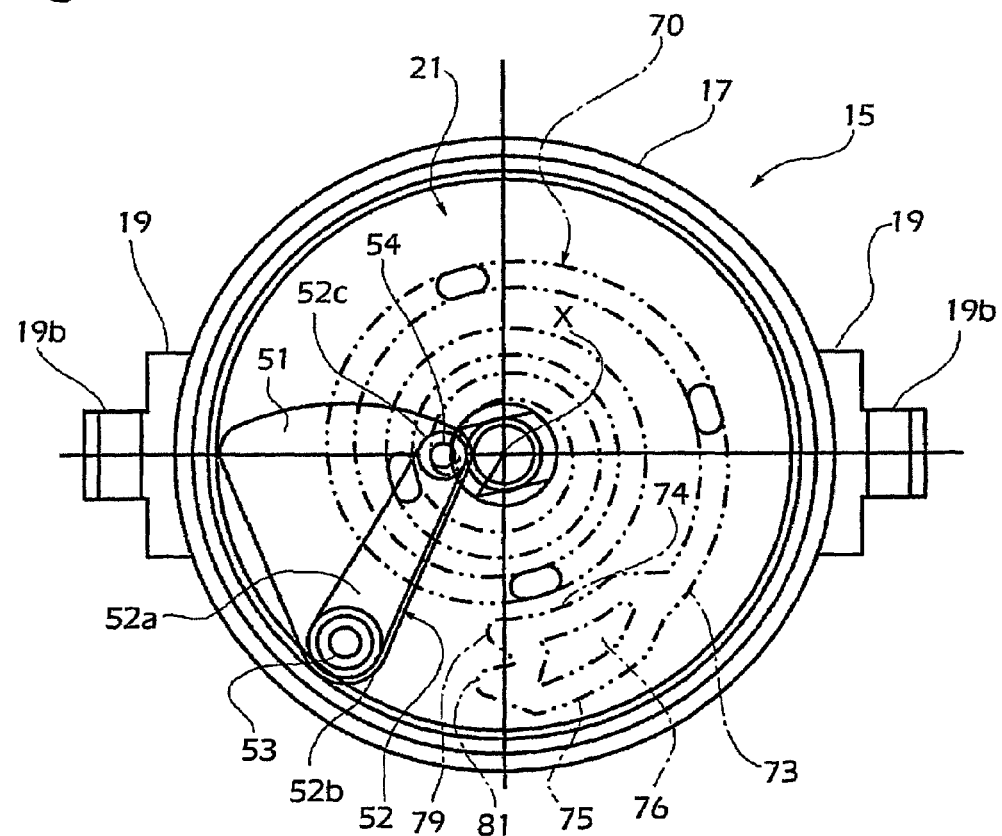

With reference also to FIGS. 3, 6 and 7 (for the sake of clarity, in FIG. 3 the casing 17 is shown without the lid 21 and the rotor 31), the base surface 23a of the chamber 18 has a recess 51 with an arm element 52 (shown in FIGS. 6 and 7) housed therein, mounted pivotably on a pin 53 formed in one piece with the base of the recess 51. The arm element 52 includes an integrally formed elongate body 52a, with a thickness along the length of the device 15 less than or equal to the depth of the recess 51. One end 52b of the body 52a of the arm element 52 is pivoted on the pin 53, while the other end 52c has a pin portion 54 projecting from the base surface 23a inwardly of the cylindrical chamber 18. Due to this configuration, the arm element 52 is able to oscillate in the bottom of the recess 51, in a plane parallel to the base surface 23a. The shape of the recess 51 can be different from that shown in FIG. 3 but it must be able to allow the arm element 52 to pivot sufficiently in order for the device to operate, as will be described later.

Figure 4:
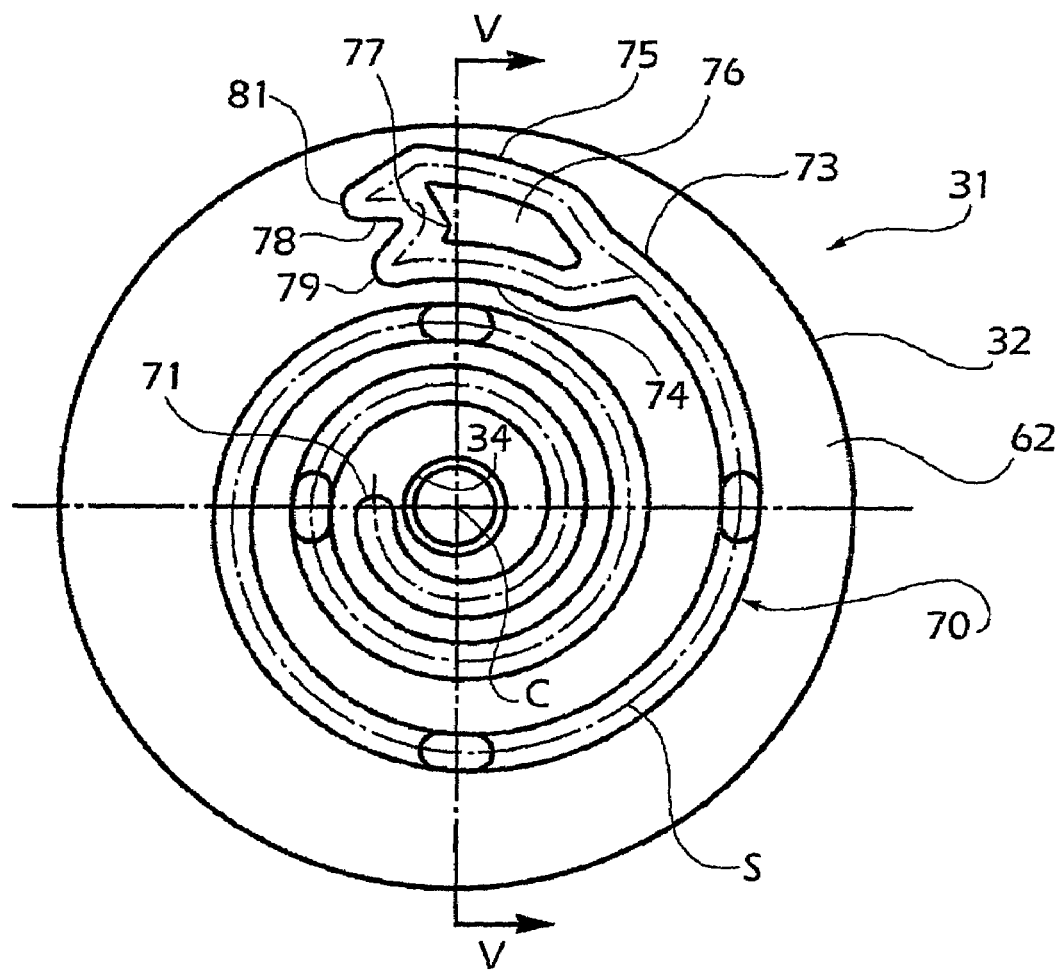
FIG. 4 is a plan view from below of another component of the device of FIG. 2.
Figure 5:
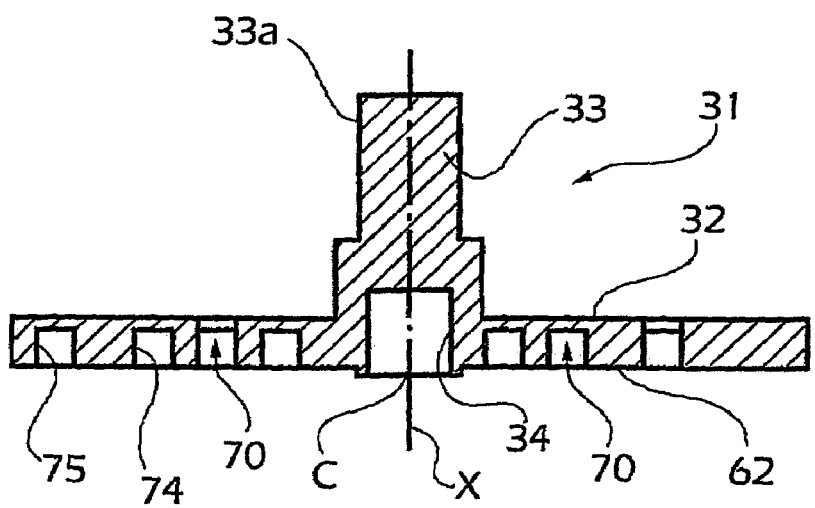
FIG. 5 is a longitudinally sectioned view of the component of FIG. 4 taken on the line V-V of this figure.

FIG. 4 is a plan view from below just of the rotor 31. An elongate groove 70, which extends spirally around the centre C of the disc portion 32 of the rotor 31, is formed in the lower surface 62 of the disc portion 32, that is the surface opposite the base surface 23a. More in particular, this groove 70 begins from its end portion 71 arranged near the centre C of the disc portion 32, then progressively moves away in radial direction from the centre C as it proceeds along its extension direction s, in such a way to approach the edge of the disc portion 32. The groove 70 ends at a second end portion 73, which extends so as to approximately form a ring, with forward and return branches 74, 75, respectively, and a cam portion 76 interposed between them.

A recess 77 is formed in the cam portion 76, in front of which a cuspid branch 78 is extended which interconnects the two branches 74, 75 of the groove 70. The cuspid branch 78 defines two sharp bends 79, 81 at its ends, substantially opposite the recess 77 of the cam portion 76.

The groove 70 is engageable by the pin portion 54 of the arm element 51, which moves along the groove when the rotor 31 is rotated relative to the casing 17. After passing the entire groove 70 beginning from the end portion 71, the pin portion 54 engages in succession the branches 75 and 74 of the groove 70, accompanied by the movement of the arm element 52, thereby accomplishing locking and release operations in the manner of the pressure latch system described with reference to the prior art.

With reference to FIGS. 6 and 7 the operation of the device according to the invention will now be described. For the sake of clarity, the lid 21 is rendered in transparency and the groove 70 is rendered in dash-dotted line.

From the latched position, in which the pin portion 54 engages the recess 77 of the cam portion 76, pressure applied on the drawer 2 causes a slight anti-clockwise rotation of the rotor 31, by means of the rack 6 engaged with the pinion 16, thereby causing the pin portion of the arm to be moved away from the recess until it reaches the bend 79, beyond which anti-clockwise rotation is prevented. The arm element 52 pivots slightly clockwise, following the movement of the pin portion 54 induced by the rotor 31.

When pressure on the drawer 2 is released, the spring 4 urges it until it is fully open. The movement transmitted to the rotor 31 causes it to rotate clockwise, whereby the pin portion 54 passes along the forward branch 74 and the rest of the groove 70 until it reaches the end of travel position defined by the end portion 71 of the groove 70 (see FIG. 6). During such movement of the rotor 31, which is slowed down by the friction with the viscous fluid, the arm element 52 follows the pin portion 54 thus pivoting clockwise, and reaches its position of maximum travel in such direction (see FIG. 6).

If pressure continues to be exerted on the drawer 2, the rotor 31 rotates anti-clockwise and the pin portion 54 returns along the groove 70 until it is diverted by the cam portion 76 into the return branch 75, whereby the arm element 52 reaches its position of maximum anti-clockwise travel (see FIG. 7).

If pressure on the drawer 2 is continued, the rotor 31 rotates until the pin portion 54 engages the bend 81 of the return branch 75, which prevents further rotation.

If pressure is released, the action of the spring 4 causes the rotor 31 to rotate slightly clockwise and, thanks to the configuration of the cuspid branch 78, the pin portion 54 is guided to the recess 77 of the cam portion 76, once again locking the rotor 31 into the starting latched position.

It will be appreciated that, although it has internal latch means, the slowing device according to the first embodiment of the invention has a structure which is more compact and is simpler to manufacture than the prior art, wherein the axial depth of the casing can be of only a few millimeters, while maintaining the high reliability of the device. In particular, the Applicant has made the portion 73 of the groove 70 with an angular extent of around 20-30° in a device with a diameter of around 2 cm. In this way, by fitting this device with the rack 6, it is possible to activate the release mechanism with a longitudinal movement of the drawer 2 of the order of one millimeter.

Further, it is possible to adapt the diameter of the rotor 31 and/or the number of the coils of the groove 70 to the required travel of the drawer 2.

It is understood that the invention is not limited to the embodiments described and illustrated here, but that the shape and arrangements of parts, construction and operating details can be modified. In the first embodiment, for example, the arm element could be mounted on the disc portion of the rotor, while the groove could be formed in the base of the chamber itself. Alternatively, it is possible to arrange these latch means between the upper surface of the disc portion and the lower surface of the casing lid, or on both sides of the disc portion.

The groove 70 can of course be orientated as a mirror image of that described, thereby causing the device to be locked or released by rotation in the opposite sense to that described above. Further, the end portion of the groove provided with the cam portion could be arranged at the end of the groove which is radially closer to the centre of the disc portion of the rotor.

In addition, it is not necessary that the arm element and the groove be arranged inside the chamber of the casing, but rather it is possible to provide for extensions of the casing and the rotor, respectively, the extensions being rotatable one relative to the other, and being arranged in such a way to form a pair of opposing surfaces for supporting the arm portion and the groove, respectively.

What is claimed is:

1. A device (15) for slowing the movement of a drawer (2) or similar member movable with respect to a fixed structure (S) and urged by unidirectional thrust means (4), including:
   a casing (17) adapted to be fixed to said movable member (2) or to said structure (S) and defining a substantially cylindrical chamber (18) containing a viscous braking fluid,
   a rotor (31) housed within said chamber (18), said rotor (31) including a disc portion (32) adapted to rotate inside said casing (17) and a shaft portion (33) extending axially from the centre (C) of the disc portion (32) and protruding through one of the end walls (21) of the casing (17) in such a way as to be able to be operatively associated with the other of said movable member (2) or the structure (S),
   a pivotable arm element (52) which is pivotably mounted on a first surface (23a) of one of said casing (17) and rotor (31) extending in a plane perpendicular to the axis of rotation of said rotor, said pivotable arm element having a pin portion (54) at one end, and
   an elongate groove (70) which is formed in a second surface (62) of the other of said casing (17) and rotor (31) extending in a plane parallel to said first surface, wherein said elongate groove (70) extends spirally around the centre (C) of the disc portion (32) of said rotor (31) and is engageable by said pin portion (54) of the arm element (52), said groove (70) having a cam portion (76) at one end (73) dividing said groove (70) into a return path (75) and a forward path (74) for said pin portion (54) in such a way as to define, in cooperation with said thrust means (4), a releasable locking position for said rotor (31) relative to the casing (17), wherein
a recess (51) is formed in said first surface (23*a*) which is adapted to face said second surface (62), wherein a pin (53) protrudes from the bottom of said recess and wherein said pivotable am element (52) is pivotably mounted on said pin of said recess and leans against the bottom of said recess in such a way that the pivotable arm element is able to oscillate in the bottom of the recess (51), said pin portion (54) protruding across said first surface (23*a*) for engaging said elongate groove (70).

2. A device (15) according to claim 1, wherein said spiral-wise groove (70) extends from its end portion (71) arranged near the centre (C) of the disc portion (32), progressively moving away in radial direction from the centre (C) as it proceeds along its extension direction (s), said end (73) provided with the cam portion (76) being arranged at the radially outermost position of said groove (70).

3. A device according to claim 1, in which said pin (53) of said recess is integrally formed with the casing (17).

4. A device according to claim 1, in which said arm element (52) is formed in one piece.

5. A device according to claim 1, in which said first surface (23*a*) is the base surface of the chamber (18) and said second surface (62) is the lower surface of the disc portion (32) of the rotor (31).

6. A device according to claim 1, in which said casing (17) and said rotor (31) include respective portions extending radially relative to the axis of rotation of the rotor (31), first and second surfaces being formed by a surface of the portion extending radially from the casing (17) and by a corresponding surface of the portion extending radially from the rotor (31).

* * * * *